United States Patent
Adjakple et al.

(10) Patent No.: US 7,453,862 B2
(45) Date of Patent: Nov. 18, 2008

(54) REFERENCE TRANSPORT CHANNEL ON/OFF STATUS DETECTION AND RESELECTION

(75) Inventors: Pascal Adjakple, Great Neck, NY (US); Charles Dennean, Melville, NY (US); Renuka Racha, Ronkonkoma, NY (US); Carl Wang, Flushing, NY (US)

(73) Assignee: InterDigital Technology Corporation, Wilmington, DE (US)

(*) Notice: Subject to any disclaimer, the term of this patent is extended or adjusted under 35 U.S.C. 154(b) by 767 days.

(21) Appl. No.: 10/675,639

(22) Filed: Sep. 29, 2003

(65) Prior Publication Data
US 2004/0120288 A1    Jun. 24, 2004

Related U.S. Application Data

(60) Provisional application No. 60/414,943, filed on Sep. 30, 2002.

(51) Int. Cl.
*H04J 3/00* (2006.01)

(52) U.S. Cl. .................. 370/345; 370/333; 370/342; 370/518

(58) Field of Classification Search .............. 370/345, 370/333, 342
See application file for complete search history.

(56) References Cited

U.S. PATENT DOCUMENTS

| | | | | |
|---|---|---|---|---|
| 6,108,525 | A * | 8/2000 | Takemura | 455/67.14 |
| 6,212,386 | B1 * | 4/2001 | Briere et al. | 455/447 |
| 6,748,234 | B1 * | 6/2004 | Agrawal et al. | 455/522 |
| 2003/0036403 | A1 * | 2/2003 | Shiu et al. | 455/522 |
| 2003/0058894 | A1 * | 3/2003 | Feuerstraeter et al. | 370/518 |

* cited by examiner

*Primary Examiner*—Vincent P. Harper
*Assistant Examiner*—Fred A Casca
(74) *Attorney, Agent, or Firm*—Volpe and Koenig, P.C.

(57) ABSTRACT

In a wireless communication system using a reference channel used for error rate measurement and associated with a plurality of transport channels multiplexed on a coded composite transport channel (CCTrCH), a method is employed for reselection of the reference channel from favorable candidate transport channels. A channel is initially selected from the plurality of multiplexed channels as the reference channel. Channels are monitored based on quantitative data content criteria to determine whether an ON or OFF state exists. A different channel is selected from the plurality of multiplexed channels as the reselected RTrCH when a better candidate transport channel in the ON state becomes available, or when the monitored RTrCH reflects an OFF state.

16 Claims, 13 Drawing Sheets

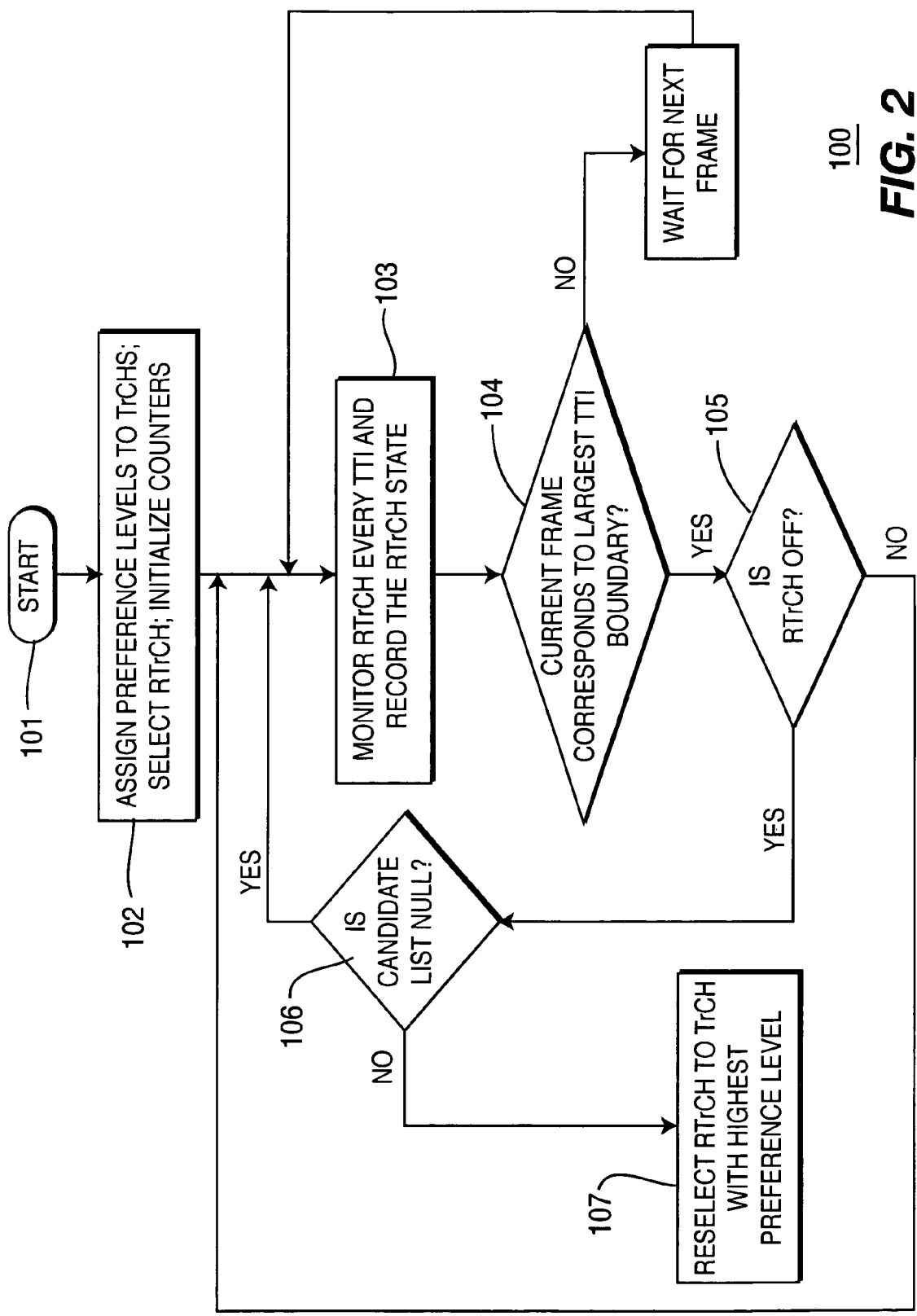

| TrCHs | BLER REQUIREMENT | TTI SIZE |
|---|---|---|
| TrCH 1 | $10^{-3}$ | 40 ms |
| TrCH 2 | $10^{-2}$ | 20 ms |
| TrCH 3 | $10^{-4}$ | 10 ms |
| TrCH 4 | $10^{-3}$ | 20 ms |
| TrCH 5 | $10^{-4}$ | 10 ms |

| PREFERENCE LEVEL | TrCHs | BLER REQUIREMENT | TTI SIZE |
|---|---|---|---|
| PL 1 | TrCH 2 | $10^{-2}$ | 20 ms |
| PL 2 | TrCH 4 | $10^{-3}$ | 20 ms |
| PL 3 | TrCH 1 | $10^{-3}$ | 40 ms |
| PL 4 | TrCH 3 | $10^{-4}$ | 10 ms |
| PL 4 | TrCH 5 | $10^{-4}$ | 10 ms |

REFERENCE TRANSPORT CHANNEL ON/OFF STATUS DETECTION AND RESELECTION

CROSS REFERENCE TO RELATED APPLICATION

This application claims priority from U.S. Provisional Application No. 60/414,943 filed Sep. 30, 2002, which is incorporated by reference as if fully set forth herein.

FIELD OF THE INVENTION

This invention relates in general to reference transport channels (RTrCHs) in wireless communications, and in particular to a method and apparatus for RTrCH reselection implementation.

BACKGROUND OF THE INVENTION

As used herein, a wireless transmit/receive unit (WTRU) includes, but is not limited to, a user equipment, mobile station fixed or mobile subscriber unit, pager, or any other type of device capable of operating in a wireless environment. When referred to hereafter, a base station includes, but is not limited to, a base station, Node B, site controller, access point, or other interfacing device in a wireless environment.

In wireless communications, one of the most important features in maintaining the communication link quality under fading and interference situations is power control. In third generation partnership program (3GPP) wideband code division multiple access (W-CDMA) systems utilizing time division duplex (TDD) mode, the UTRAN (SRNC-RRC) sets the initial target signal to interference ratio (SIR) to the WTRU at the call/session establishment and then subsequently continuously adjusts the target SIR of the WTRU during the life term of the call as dictated by the observation of the uplink (UL) block error rate (BLER) measurement.

A variety of services, such as video, voice, and data, each having different Quality of Service (QoS) requirements, can be transmitted using a single wireless connection. This is accomplished by multiplexing several transport channels (TrCHs), each service on its own TrCH, onto a coded composite transport channel (CCTrCH). The transmitted information is sent in units of transport blocks (TBs). Each service's QoS requirement can be monitored on a BLER basis. The rate at which each service is transmitted is on a transmission time interval (TTI). The smallest interval is one frame of data, typically defined as 10 ms for a 3G communication system. Each frame is tracked by a system connection frame number (CFN), which is encoded into the frame header. TTIs are typically in intervals of 10 ms frame durations (i.e., 10, 20, 30, 40 ms, etc.). In particular for 3GPP systems, TTIs can only be 10, 20, 40, or 80 ms. The TTI for each service depends on the type of service and its QoS requirements. Because of these differences, a variety of TTIs associated with their respective TrCHs may exist on a single CCTrCH.

In order to monitor the BLER value at a CCTrCH level, as opposed to a TrCH level, one approach is to simultaneously monitor the BLER value of each TrCH multiplexed on the CCTrCH. A drawback to this approach is the potentially excessive use of system resources to monitor more channels than may be necessary.

Alternatively, in order to monitor the BLER level on a CCTrCH basis, a reference transport channel (RTrCH) may be selected among the transport channels multiplexed on the considered CCTrCH. The difficulty of this approach, especially for variable bit rate services, is the reselection of the RTrCH, since the initially selected RTrCH may become temporarily unavailable (OFF) during periods where it does not carry any data.

SUMMARY OF THE INVENTION

A method and implementing equipment are provided for a wireless communication system wherein wireless communications between communication stations includes the transmission of a composite channel on which a plurality of channels are multiplexed. The invention is intended for such systems wherein an error rate measurement is performed on received signals on a reference channel selected from the plurality of multiplexed channels. The error rate measurement is conventionally used in selectively controlling transmission of the composite channel, such as in power control for example.

A preferred method includes selecting a channel from the plurality of multiplexed channels as the reference channel initially used for error rate measurement. The reference channel is monitored based on quantitative data content criteria to determine an ON state when the quantitative data content criteria is met, and an OFF state when the quantitative data content criteria is not met. When monitoring of the reference channel reflects an OFF state, a different channel is selected from the plurality of multiplexed channels as the reference channel.

Preferably, the channels are transport channels (TrCHs), the reference channel is a reference transport channel (RTrCH), and each TrCH has a transport time interval (TTI) of a given size, of which a largest TTI size is an integer multiple, such as in a 3GPP system. In such systems, the TrCHs are multiplexed on a coded composite transport channel (CCTrCH) and a block error rate (BLER) measurement is performed on the RTrCH. Preferably, monitoring of the RTrCH is performed no less than once during each time interval corresponding to the TTI size of the RTrCH. Alternatively, the monitoring occurs upon a data reception on any TrCH.

Each TrCH has a BLER requirement. Preferably, a TrCH having a least restrictive BLER requirement is selected as the RTrCH initially used for BLER measurement. While there are N number of TrCHs multiplexed onto the CCTrCH, the TrCHs are preferably assigned a preference level for selection, first through $N^{th}$, based first on their BLER requirement and then on TTI size, such that the first TrCH has a least restrictive BLER requirement and a smallest TTI size among TrCHs having the same BLER requirement and the $N^{th}$ TrCH has a most restrictive BLER requirement and a largest TTI size among TrCHs having the same BLER requirement. In such case, the first TrCH is selected as the RTrCH initially used for error rate measurement. When the first TrCH is selected as the RTrCH and monitoring of the first TrCH channel reflects an OFF state, the second TrCH is then selected as the RTrCH. Generally, when an $i^{th}$ TrCH is selected as the RTrCH, where i is less than N, and monitoring of the $i^{th}$ TrCH channel reflects an OFF state, a different TrCH is then preferably selected as the reselected RTrCH from among the group of channels consisting of the first TrCH through the $(i+1)^{th}$ TrCH.

In the general case, wherein an $i^{th}$ TrCH is selected as the RTrCH, where i is less than N, monitoring can be expanded such that the first through the $i^{th}$ TrCHs are monitored to determine ON and OFF states of each.

In general, monitoring of a TrCH is preferably performed no less than once during each time interval corresponding to the TTI size of the TrCH. Also, the determining when a TrCH is in an OFF state preferably includes determining that data was not received on the TrCH for a predetermined number of consecutive TTIs of the TrCH. Determining when the monitored TrCH is in an ON state preferably includes determining that data was received on the TrCH in at least one of a predetermined number of TTIs of the TrCH. A TrCH having the largest TTI size defines TTI boundaries based on that largest size for all TrCHs, and the selection of a different TrCH from the plurality of multiplexed TrCH as the reselected RTrCH preferably becomes effective at one of such defined TTI boundaries.

The invention includes a receiver for a communication station, either a base station or a WTRU, for use in such a wireless communication system. The receiver has composite channel signal processing circuitry that includes error measurement circuitry, monitoring circuitry, and reference channel selection circuitry. The error measurement circuitry is preferably configured to perform an error rate measurement on received signals on a selected reference channel of the composite channel. The monitoring circuitry is preferably configured to monitor the selected reference channel based on quantitative data content criteria to determine an ON state when the quantitative data content criteria is met, and an OFF state when the quantitative data content criteria is not met. The reference channel selection circuitry is preferably configured with a default channel selection and is responsive to the monitoring circuitry such that when monitoring of the reference channel reflects an OFF state, the reference channel selection circuitry selects a different channel from the plurality of multiplexed channels as the reference channel for the error measurement circuitry and the monitoring circuitry.

The receiver is preferably configured for a 3GPP like system, wherein the channels are TrCHs, the reference channel is a RTrCH, each TrCH has a TTI of a given size of which a largest TTI size is an integer multiple, and the TrCHs are multiplexed on a CCTrCH. In such case, the error measurement circuitry is configured to perform a BLER measurement on the RTrCH, and the monitoring circuitry is configured to monitor the RTrCH no less than once during each time interval corresponding to the TTI size of the RTrCH.

Where the TrCHs each have a block error rate (BLER) requirement, the reference channel selection circuitry is preferably configured with a TrCH having a least restrictive BLER requirement as the default TrCH selection initially used as the RTrCH. Generally, where there are N number of TrCHs multiplexed onto the CCTrCH, the reference channel selection circuitry is preferably configured to assign preference level for selection of the TrCHs, first through $N^{th}$, based first on their BLER requirement and then on TTI size, such that the first TrCH has a least restrictive BLER requirement and a smallest TTI size among TrCHs having the same BLER requirement and the $N^{th}$ TrCH has a most restrictive BLER requirement and a largest TTI size among TrCHs having the same BLER requirement, and the first TrCH is selected as the RTrCH initially used for error rate measurement. In such case, the reference channel selection circuitry is preferably configured such that when the first TrCH is selected as the RTrCH and monitoring of the first TrCH channel reflects an OFF state, the second TrCH is then selected as the RTrCH. A TrCH having the largest TTI size defines TTI boundaries based on that largest size for all TrCHs. The reference channel selection circuitry is preferably configured such that the selecting a different TrCH from the plurality of multiplexed TrCH as the RTrCH becomes effective at one of such defined TTI boundaries.

In general, the reference channel selection circuitry is preferably configured such that when an $i^{th}$ TrCH is selected as the RTrCH, where i is less than N, and monitoring of the $i^{th}$ TrCH channel reflects an OFF state, a different TrCH is then selected as the RTrCH from among the group of channels consisting of the first TrCH through the $(i+1)^{th}$ TrCH. In such case, the monitoring circuitry is preferably configured such that when an $i^{th}$ TrCH is selected as the RTrCH, where i is less than N, the first through the $i^{th}$ TrCHs are monitored based on a quantitative data content criteria to determine an ON and OFF states. Preferably, the reference channel selection circuitry is then configured such that when monitoring of the $i^{th}$ TrCH channel reflects an OFF state, if any TrCH is determined to be in an ON state, the highest order TrCH that is determined to be in an ON state is then selected as the RTrCH.

In general, the monitoring circuitry is preferably configured such that monitoring of a TrCH is performed no less than once during each time interval corresponding to the TTI size of the TrCH. Also, the monitoring circuitry is preferably configured such that the determining when a TrCH is in an OFF state includes determining that data was not received on the TrCH for a predetermined number of consecutive TTIs of the TrCH. One alternative is that the monitoring circuitry is configured such that the determining when TrCH is in an ON state includes determining that data was received on the TrCH in at least one of a predetermined number of TTIs of the TrCH.

Other advantages will be apparent from the following description of preferred embodiments, and the accompanying drawings.

BRIEF DESCRIPTION OF THE DRAWINGS

A more detailed understanding of the invention may be had from the following description of preferred embodiments, given by way of example and to be understood in conjunction with the accompanying drawing wherein:

FIG. 2 shows a flow diagram of an overview of a first embodiment for RTrCH monitoring and reselection;

ACRONYMS

The following acronyms are used in this application:

| | |
|---|---|
| 3G | Third Generation |
| BLER | block error rate |
| CCTrCH | coded composite transport channel |
| CFN | connection frame number |
| MAC | medium access control |
| OAM | operation, administration, and maintenance |
| QoS | quality of service |
| RNC | radio network controller |
| RRC | radio resource control |
| RTrCH | reference transport channel |
| SIR | signal to interference ratio |
| SRNC | serving RNC |
| TrCH | transport channel |
| TTI | transmission time interval |
| UL | uplink |
| UMTS | universal mobile telecommunications system |
| UTRAN | UMTS terrestrial radio access network |
| VBR | variable bit rate |
| WTRU | wireless receive/transmit unit |

DESCRIPTION OF PREFERRED EMBODIMENTS

Although the embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, the embodiments are applicable to CDMA systems, in general, such as the proposed frequency division duplex (FDD) mode of 3GPP W-CDMA.

The preferred approach for BLER measurement according to the present invention is to limit the number of TrCHs to be monitored for BLER. The first embodiment exclusively limits the BLER monitoring to a single TrCH, that being the RTrCH. FIG. 2 shows a basic flow diagram for the selection of the initial RTrCH and the subsequent reselection of the RTrCHs for when it becomes necessary to replace the current RTrCH with a better candidate. To summarize, an initial RTrCH is selected based on prioritization criteria. The RTrCH is monitored for ensuring whether it is maintaining an ON status. If it is detected that its activity falls below an acceptable level, the next best candidate TrCH is chosen as the reselected RTrCH to replace the initial RTrCH, since an RTrCH in an OFF state is not preferred for BLER measurement. The timing of the reselection is also carefully tracked to prevent the transition from occurring at an inopportune time.

Each step of process 100 will now be described in further detail in reference to FIG. 2. After the step 101 start, the first step is to select the initial RTrCH in step 102. This is achieved by assignment of a preference level PL to each TrCH multiplexed onto the CCTrCH. The TrCH with the highest preference level PL1 is selected as the initial RTrCH. The remaining TrCHs are sorted in descending order of preference level PL.

Figures 3A, 3B, 3C:
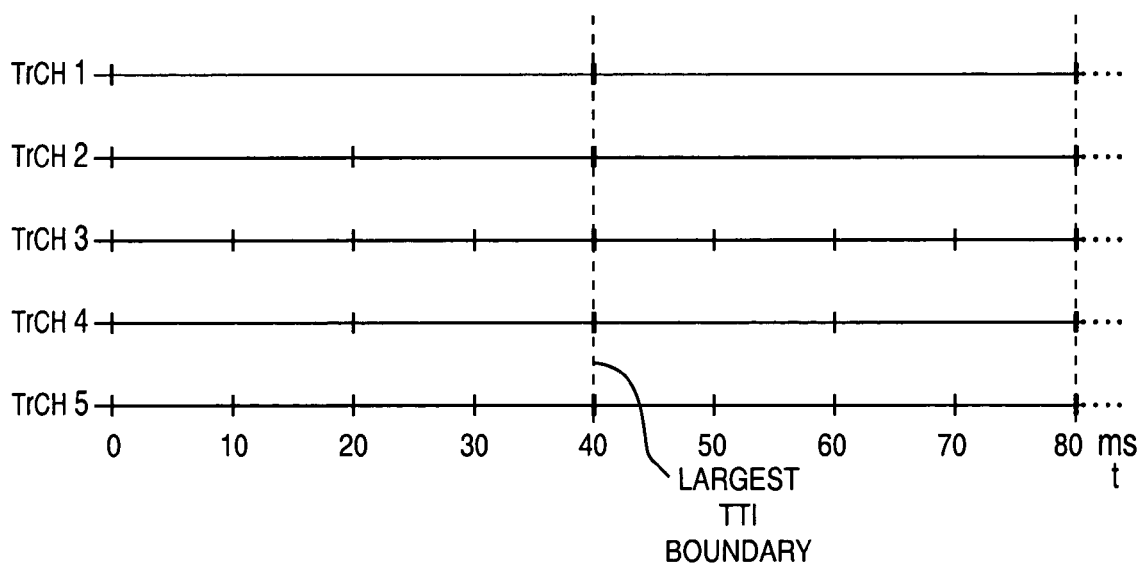
FIGS. 3A-3C show an example set of transport channels for prioritization by parameters.

As an example, FIGS. 3A-3C show a set of five transport channels TrCH1-TrCH5 for mapping onto the CCTrCH. FIG. 3A shows TrCH1-TrCH5 sorted by channel number, each with a respective BLER requirement and TTI size. In FIG. 3B, each preference level PL is assigned based on the BLER requirement, with highest preference given to lowest BLER requirement (i.e., the least restrictive BLER requirement), which corresponds to the highest BLER requirement value.

The next parameter for assigning preference level PL is TTI size. Accordingly, transport channel TrCH2 is assigned preference level PL1 because it has the lowest BLER requirement, $10^{-2}$. Transport channels TrCH4 and TrCH1 each have a higher BLER requirement of $10^{-3}$, but transport channel TrCH4 is assigned the higher preference level PL as it has the smaller TTI size of 20 ms compared to the 40 ms TTI size of TrCH1. Accordingly, transport channel TrCH4 is assigned preference level PL2 and transport channel TrCH1 is assigned preference level PL3. Lastly, transport channels TrCH3 and TrCH5 are each assigned preference level PL4, as they both have the highest BLER requirement of $10^{-4}$ and the same TTI size of 10 ms. When further tie breakers are necessary, such as with transport channels TrCH3 and TrCH5, the selection of RTrCH from these two transport channels will be on a random basis.

Returning to step 102 of FIG. 2, a plurality of counters associated with the ON/OFF monitoring of TrCHs and the RTrCH are initialized. (See TABLE 1 for a summary of counters along with a brief description of their related function.) The list of candidate transport channels CAND_LIST includes all transport channels multiplexed on the CCTrCH, with the exception of the RTrCH, both at initialization and throughout the reselection process. Counter COUNT (RTrCH), which monitors the number of occurrences of presence or absence of data on the RTrCH during a monitoring cycle, is reset to zero. Observation period counter OP(RTrCH), which counts how long the RTrCH is being monitored, is also reset to zero. Counter OP(RTrCH) is expressed in terms of number of RTrCH TTIs and is used while monitoring a channel in OFF state. Since process 100 only monitors one channel at any given time (i.e., RTrCH), only one of each of the above initialized parameter counters is necessary to perform monitoring and reselection of RTrCH.

In step 103, RTrCH is monitored every TTI, and the ON/OFF state of the RTrCH is recorded as RTrCH_ST. Determination of the ON/OFF state involves detection of data or the absence of data on the monitored channel RTrCH. Further, a designated observation period is used for establishing the density of the data detection for declaring an ON/OFF status with a degree of reasonable certainty. The ON/OFF status is therefore a matter of choice, established by comparing data detection to predetermined selection criteria parameters.

Next, the timing of the current frame is checked for correspondence to the largest TTI boundary in order to establish whether it is the proper time for RTrCH reselection (step 104). The current frame is tracked by counter COUNT(F). The largest TTI boundary is the largest common TTI among the all TrCHs, including the RTrCH. This is preferably obtained by using a modulo operation to determine the TTI boundary of each TrCH. An example for largest TTI boundary determination is shown in FIG. 3C with reference to TrCH1-5 of FIGS. 3A and 3B. As shown in FIG. 3C, the largest TTI boundary occurs at intervals of 40 ms due to the largest TTI size of 40ms for this set of TrCHs.

In step 104, if the current frame is not at the largest TTI boundary, then switching to a different RTrCH cannot occur at this point. The process is restarted at step 103 at the next frame. If, however, at step 104, the current frame corresponds to the largest TTI boundary, then process 100 proceeds to step 105, where a potential reselection of the RTrCH may occur.

Step 105 is an ON/OFF status check of RTrCH state counter RTrCH_ST that was recorded in step 103. If RTrCH_ST=ON, there is no need to reselect RTrCH, so the process returns to step 103 for continuation of monitoring the RTrCH. If RTrCH_ST=OFF at step 105, the process proceeds to step 106 for a decision on whether there are any other candidates for RTrCH. If the list of candidates CAND_LIST is null, i.e., there are no TrCHs in the candidate list CAND_LIST, the process returns to step 103, keeping the same RTrCH despite its OFF state. The expectation is that shortly within the next occurring frames, either the current RTrCH will come back on, or another candidate RTrCH will become available. Thus, BLER measurement using an OFF RTrCH will be kept to a minimum. Reestablishing BLER measurement is based on selecting the best possible transport channel as the RTrCH. Returning to step 106, if there is an available candidate, an RTrCH reselection is made at step 107 to the TrCH with the highest preference level PL.

TABLE 1

| Counter | Function |
| --- | --- |
| COUNT(F) | Provides the count of the current frame |
| OP(RTrCH) | Observation period counter of the RTrCH used during monitoring of channel in OFF state |
| CAND_LIST | Candidate list of TrCHs to be selected from at RTrCH reselection |
| RTrCH_ST | ON/OFF state of the RTrCH |
| COUNT(RTrCH) | Number of occurrences of presence or absence of data on RTrCH during one monitoring cycle |

Each of the above steps of FIG. 2 will now be explained in further detail with reference to FIGS. 4-6.

Figure 4:
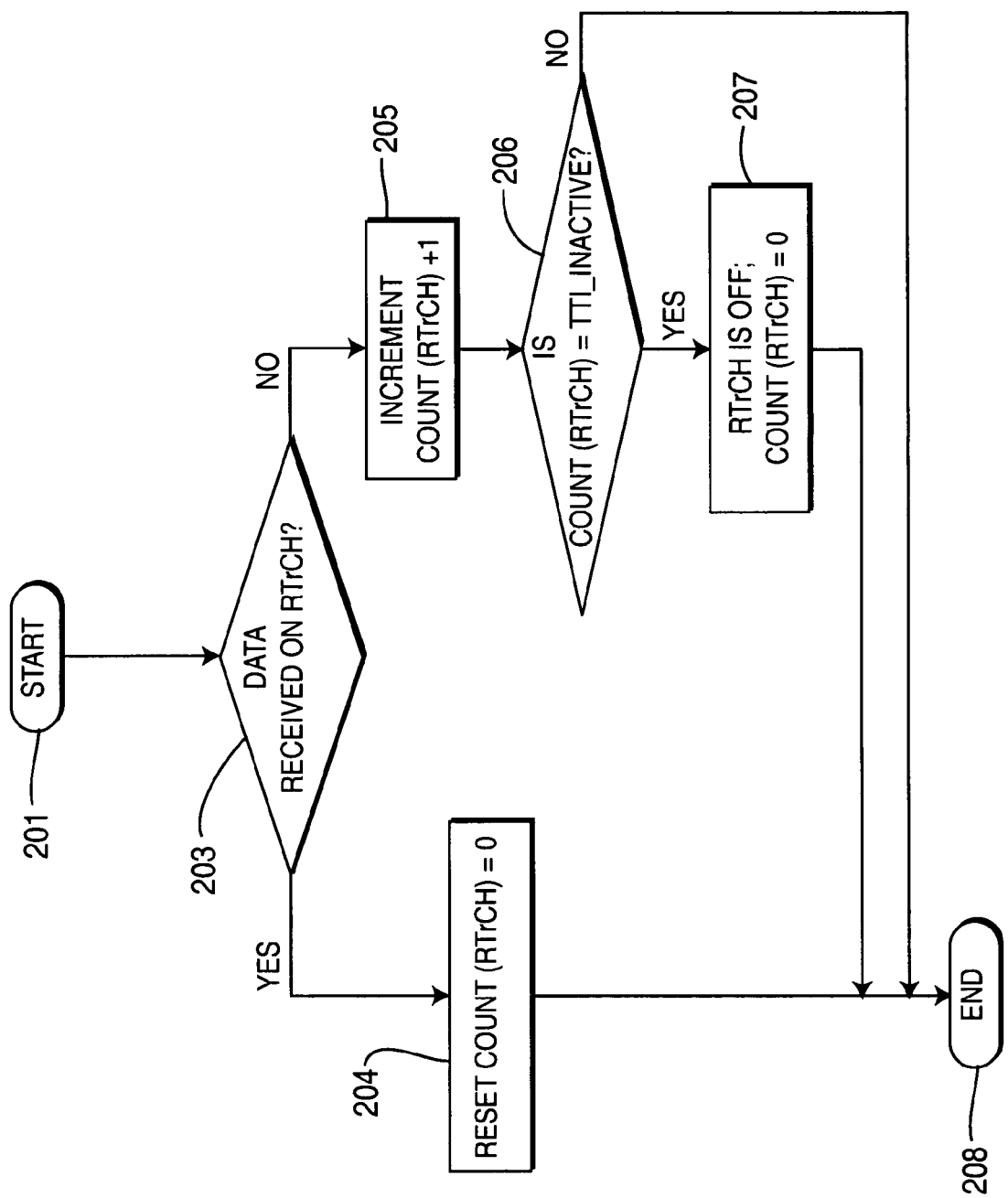
FIG. 4 shows a flow diagram of the monitoring of the current RTrCH in "ON" state.

In FIG. 4, a flow diagram of RTrCH monitoring process 200 is shown for when RTrCH is active (i.e., RTrCH_ST=ON) at the start (step 201), for determining whether the level of activity has subsided enough to declare an OFF state for RTrCH (i.e., RTrCH_ST=OFF). Process 200 occurs during step 103 of process 100. Process 200 verifies the current RTrCH state at every TTI for that RTrCH. For example, if TrCH2 is the RTrCH, its TTI is 20 ms, and therefore, process 200 repeats every 20 ms (i.e., TTI(RTrCH)=20).

Figure 5:
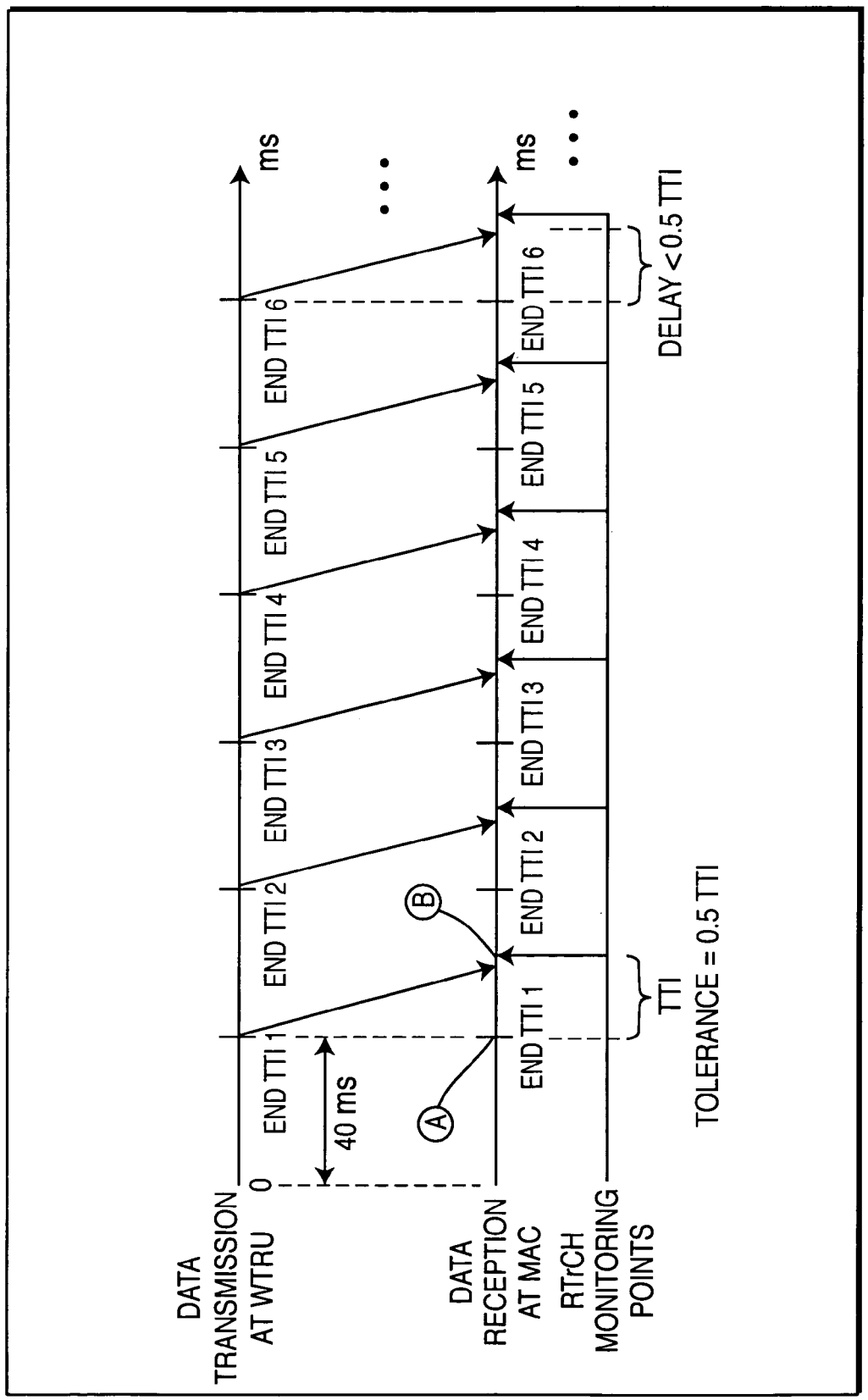
FIG. 5 shows a representation of a transport channel monitoring point with tolerance along the time axis.

FIG. 5 illustrates adjustment of the timing of transport channel monitoring received at the MAC. In order to take into account the uplink transfer delay, the RTrCH state monitoring is not performed at the boundary (end-point) of the TTI, but rather after the end-point of the TTI. This accounts for the radio interface delay, data channel delay, and data processing delay. For simplicity, the offset with respect to the TTI endpoint can be specified through OAM provisioning. For instance, a total delay is shown in FIG. 5 which is less than 0.5 TTI. In order to counteract the delay, an offset TTI_Tolerance can be specified as 0.5 TTI, where the monitoring point B is 0.5 TTI beyond the TTI boundary point A.

Returning to FIG. 4, a decision occurs at step 203 to check for whether data is received on the RTrCH. If so, the counter COUNT(RTrCH) is reset to zero at step 204 and the process cycle ends at step 208. This reset at step 204 occurs since process 200 only tracks consecutive inactive readings of the RTrCH, as the objective is to determine when the RTrCH can be declared OFF. If at step 203 no data is received on the RTrCH, the RTrCH counter COUNT(RTrCH) is incremented by one in step 205. Following step 205 is the decision (step 206) whether the incremented counter COUNT(RTrCH) value has reached the predefined parameter TTI_Inactive. For example, if it is desired to have no more than five (5) sequential inactive TTIs for a RTrCH, parameter TTI_Inactive is predefined to equal five (5). Once counter COUNT(RTrCH) is incremented to a value of five (5) at step 206, the RTrCH is declared OFF (i.e., RTrCH_ST=OFF), as shown in step 207. When the RTrCH is set to OFF, counter COUNT(RTrCH) is reset to zero and the monitoring cycle 200 is complete at step 208.

Figure 6:
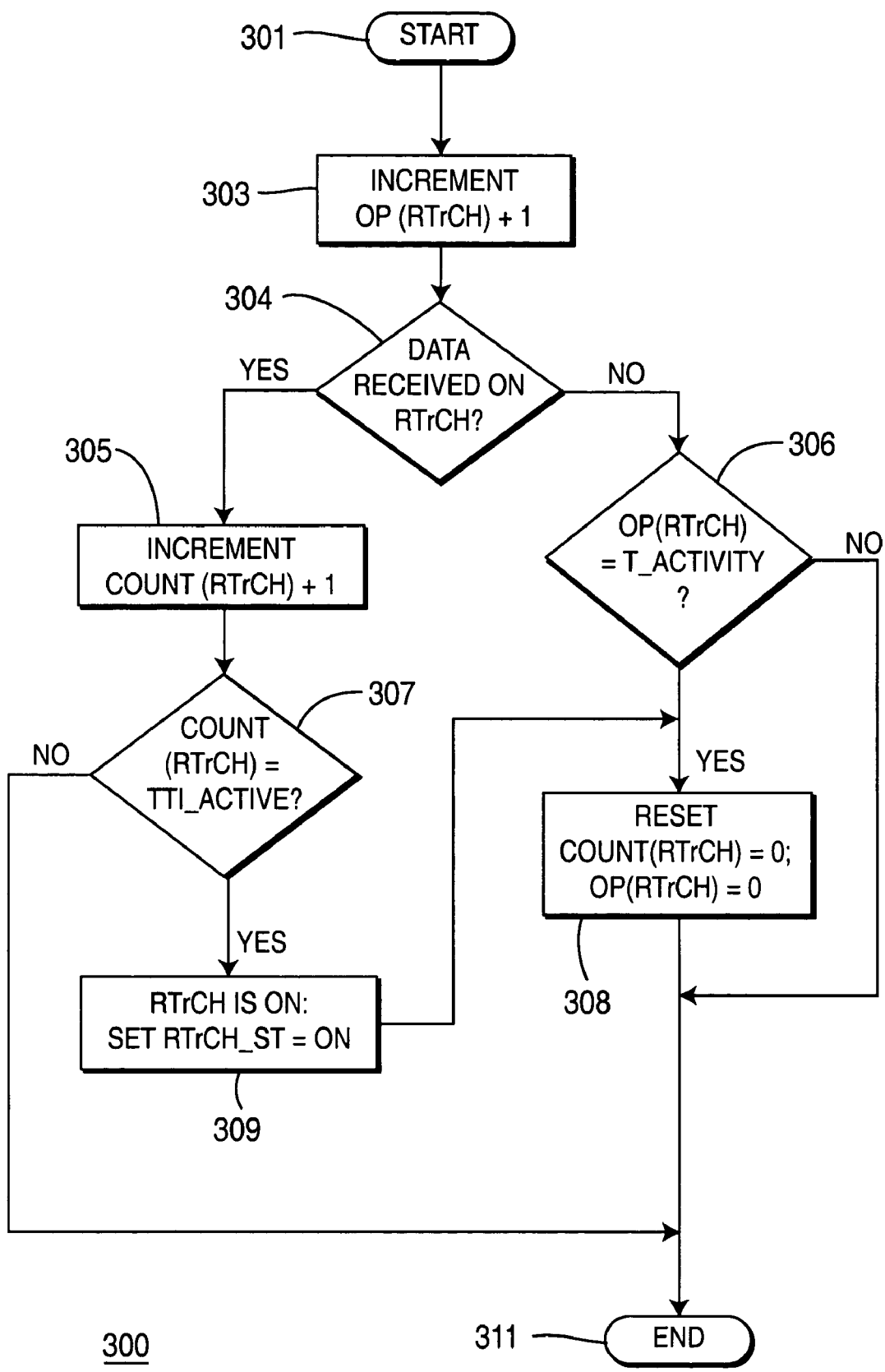
FIG. 6 shows a flow diagram of the monitoring of the current RTrCH in "OFF" state.

FIG. 6 shows a process 300 for monitoring the RTrCH while RTrCH_ST=OFF, to decide when it can be considered reactivated, and thus declared ON (i.e., RTrCH_ST=ON). Process 300 is part of step 103 in process 100 shown in FIG. 2. Because reselection of the RTrCH is to occur when the RTrCH is OFF, it is important to establish whether the RTrCH is indeed OFF prior to reselection. If it is determined in process 300 that the RTrCH is active enough such that RTrCH_ST can be switched from OFF to ON, the need for reselection is eliminated, and the RTrCH monitoring and reselection process 100 repeats at step 103. Repetition of process 100 occurs at every TTI(RTrCH) plus TTI_Tolerance.

Returning to FIG. 6, process 300 begins at step 301. At step 303, the RTrCH observation period OP(RTrCH) is incremented by one. In step 304, the RTrCH is monitored for whether data is received. If so, RTrCH counter COUNT(RTrCH) is incremented by one in step 305. Following step 305, the RTrCH counter COUNT(RTrCH) is compared to the predetermined reference TTI_Active for number of active TTIs, to determine whether enough activity on the RTrCH has occurred such that the status can be switched from OFF to ON. If counter COUNT(RTrCH) does not equal the required minimum TTI_Active reference, the process ends at step 311. However, if in step 307 the count has reached the requisite number for activity TTI_Active, the RTrCH state is set to ON (step 309), and counters COUNT(RTrCH) and OP(RTrCH) are reset to zero, ending the process at step 311.

Returning to step 304, if data is not received on the RTrCH, step 306 examines whether the observation period OP(RTrCH) has reached parameter T_Activity, indicating that the predetermined number of observation periods has elapsed. Reference parameter T_Activity is useful for setting the desired period of monitored cycles of process 300 to ensure an acceptable density of activity. If the RTrCH has activity that is very spurious, then it is not ready to be considered ON. For example, if single bursts of activity are interspersed with several consecutive TTIs with no data, eventually COUNT(RTrCH) would reach TTI_Active, but with a low percentage of activity over the observation period, (e.g., 5%), the RTrCH would be of little use as a reference channel. Accordingly, with OP(RTrCH) reaching the T_Activity reference in step 306, the counters for the RTrCH activity T_Activity and the observation period counter OP(RTrCH) are both reset to zero, bringing the monitoring process to an end at step 311. If the observation period at step 306 is not equal to the value for T_Activity, the counters COUNT(RTrCH) and OP(RTrCH) are not reset so that their counts are maintained for subsequent cycles of process 300, and the cycle ends at step 311.

TABLE 2, below, summarizes the parameters defined by the RNC for analysis against the various counters used for monitoring the ON/OFF state of the RTrCH:

TABLE 2

| Parameter | Description |
| --- | --- |
| TTI_Inactive | Maximum number of consecutive TTIs with inactive RTrCH that can acceptably be endured (to declare ON RTrCH OFF)' |
| TTI_Active | Minimum required number of TTIs with active RTrCH over a period T_Activity (used to declare an OFF RTrCH ON) |
| T_Activity | period of TTIs to be monitored for RTrCH activity prior to declaring an OFF RTrCH ON |
| TTI(RTrCH) | TTI size for the RTrCH which is the duration for one monitoring cycle |

Figure 7:
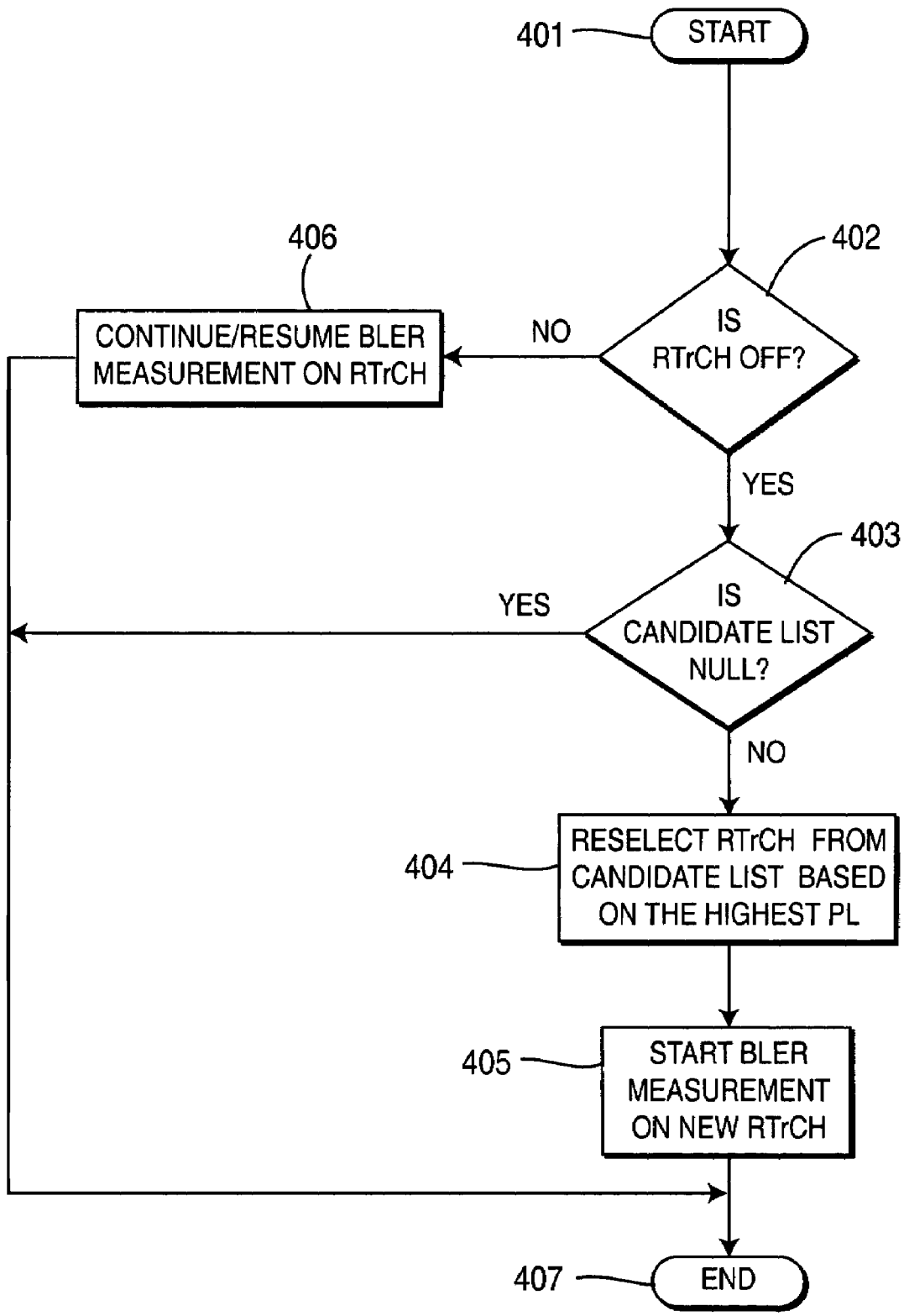
FIG. 7 shows a flow diagram for switching of RTrCHs during reselection.

Steps 105-107 of FIG. 2 are shown in more detail by the flow diagram of FIG. 7. Process 400 shown in FIG. 7 determines whether to reselect the RTrCH (i.e., whether or not to switch over to a better candidate TrCH to act as the RTrCH). Process 400 occurs at every largest TTI boundary, which is at every 40 ms for the set of five transport channels TrCH 1-5 shown in FIG. 3C. This boundary is chosen to avoid switching transport channels that may be in midstream. For instance, if the RTrCH reselection were to occur at 20 ms in FIG. 2, TrCH1 has not yet completed its transmission of data, and it would be undesirable to switch over to TrCH1 as the next RTrCH at that moment.

Returning to FIG. 7, process 400 begins at step 401 and proceeds to a decision at step 402 as to whether the RTrCH is ON or OFF. If the RTrCH is ON (i.e., RTrCH_ST=ON), BLER measurement on the RTrCH continues/resumes at step 406, and switching process 400 is completed at step 407. If the RTrCH is OFF (i.e., RTrCH_ST=OFF) at step 402, the process proceeds to step 403 where candidate list CAND_LIST is checked for the absence of candidates. If CAND_LIST is null, the process ends at step 407. It should be noted, however, that this would occur only if there were one TrCH multiplexed on the CCTrCH, which would indefinitely serve as the RTrCH. In such a case, monitoring process 400 continues to monitor the RTrCH to detect when its state changes to ON. If there are candidates in CAND_LIST at step 403, process 400 proceeds to step 404 and a new RTrCH is chosen from CAND_LIST in order of highest preference level PL (step 404). BLER measurement on the new RTrCH commences at step 405 and the process is complete at step 407.

In a second embodiment of the present invention, more than one TrCH is monitored by BLER measurement unit 20 to track ON/OFF states. Unlike the first embodiment where only the RTrCH is monitored, all TrCHs that were once the RTrCH are kept in a hot-candidate list HOTCAND_LIST sorted by preference level PL. During the reselection process, which occurs at every largest TTI boundary, the preferred TrCH for reselection as the RTrCH is the TrCH from among the hot-candidates in HOTCAND_LIST which has the highest preference level PL and is in the ON state. In addition to the hot-candidate transport channels, transport channels in CAND_LIST are available as candidates for reselection.

Figure 8:
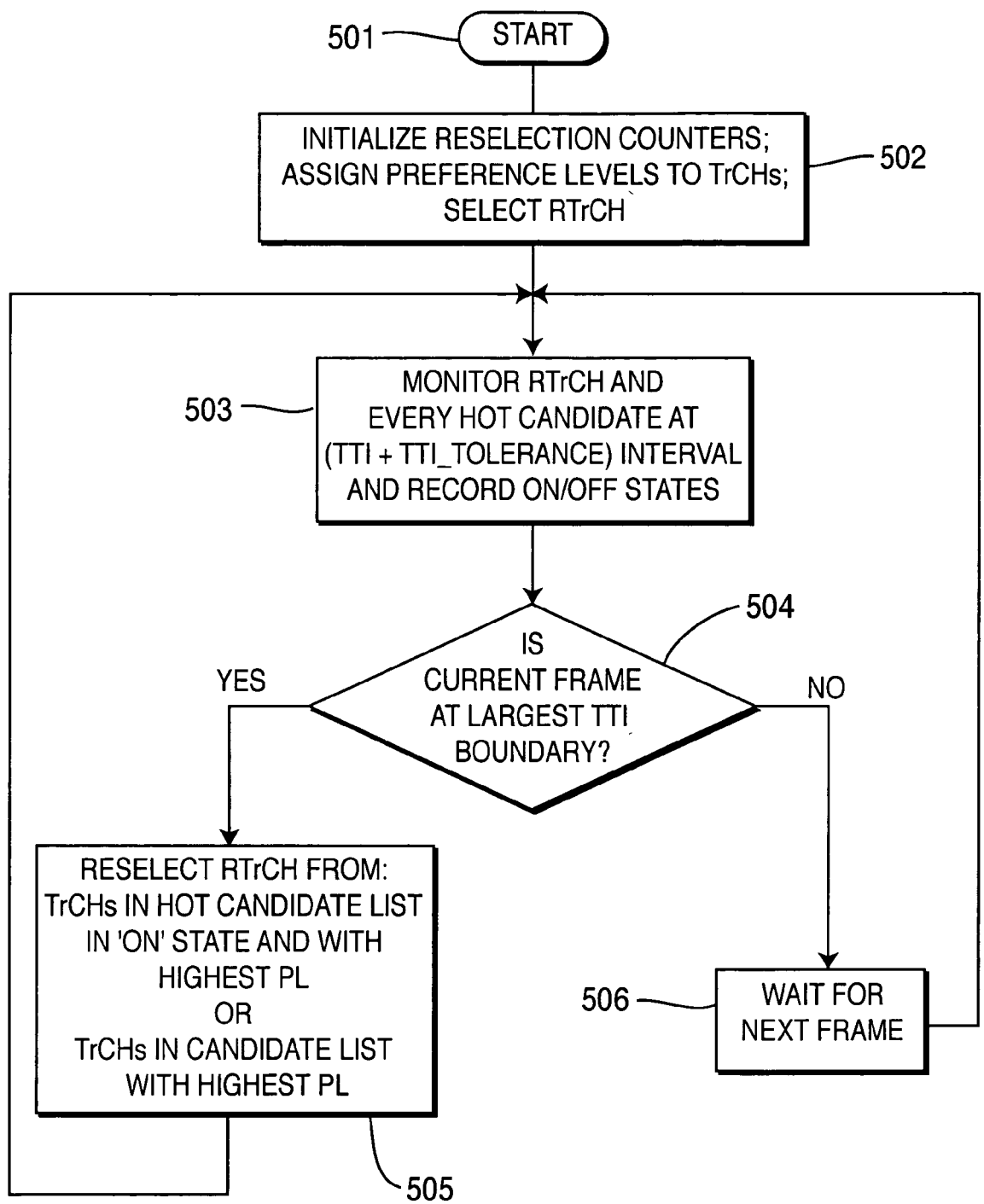
FIG. 8 shows an overview of a second embodiment for RTrCH monitoring and reselection shown in FIGS. 9 and 10.

FIG. 8 shows a flow diagram of process 500, which is the overview of the second embodiment for monitoring and reselection of the RTrCH. Following the start at step 501, the RTrCH is selected from transport channels TrCHs in step 502 based on assigned preference levels PL, just as described for process 100 shown in FIG. 2, and the process counters are initialized. At step 503, in addition to monitoring the RTrCH, each hot-candidate transport channel TrCH_i on the hot-candidate list HOTCAND_LIST is also monitored at intervals of TTI plus a nominal tolerance TTI_Tolerance for uplink transfer delay. The ON/OFF state for the RTrCH and the hot-candidates TrCH_i are recorded in TrCH_i_ST. Next, the current frame is compared for correspondence to the largest TTI boundary in step 504. If the current frame is not at the largest TTI boundary, the process is delayed for one frame (step 506), and then resumed at step 503. Once the current frame corresponds to the largest TTI boundary TTI_Boundary at step 504, the process continues at step 505 where the next RTrCH is selected from either 1) TrCHs in the hot-candidate list HOTCAND_LIST in an ON state and with the highest preference level PL; or 2) from the candidate list CAND_LIST with the highest preference level PL. Once the RTrCH reselection is completed in step 505 the cycle is repeated beginning with step 503.

Each of the above steps of process 500 will now be explained in further detail. During initialization in step 502, candidate list CAND_LIST is loaded with the identity of each transport channel TrCH multiplexed on the CCTrCH other than the RTrCH. Counters HOTCAND_LIST, OP(RTrCH), COUNT(TrCH_i), OP(TrCH_i) are all initialized to zero. Each hot-candidate transport channel TrCH_i is monitored by its own counter represented by COUNT(TrCH_i). Observation periods of the RTrCH and TrCH_i (i.e., OP(RTrCH) and OP(TrCH_i), respectively), are counters used to monitor how long, in terms of TTI, a given channel is being monitored.

Figure 9:
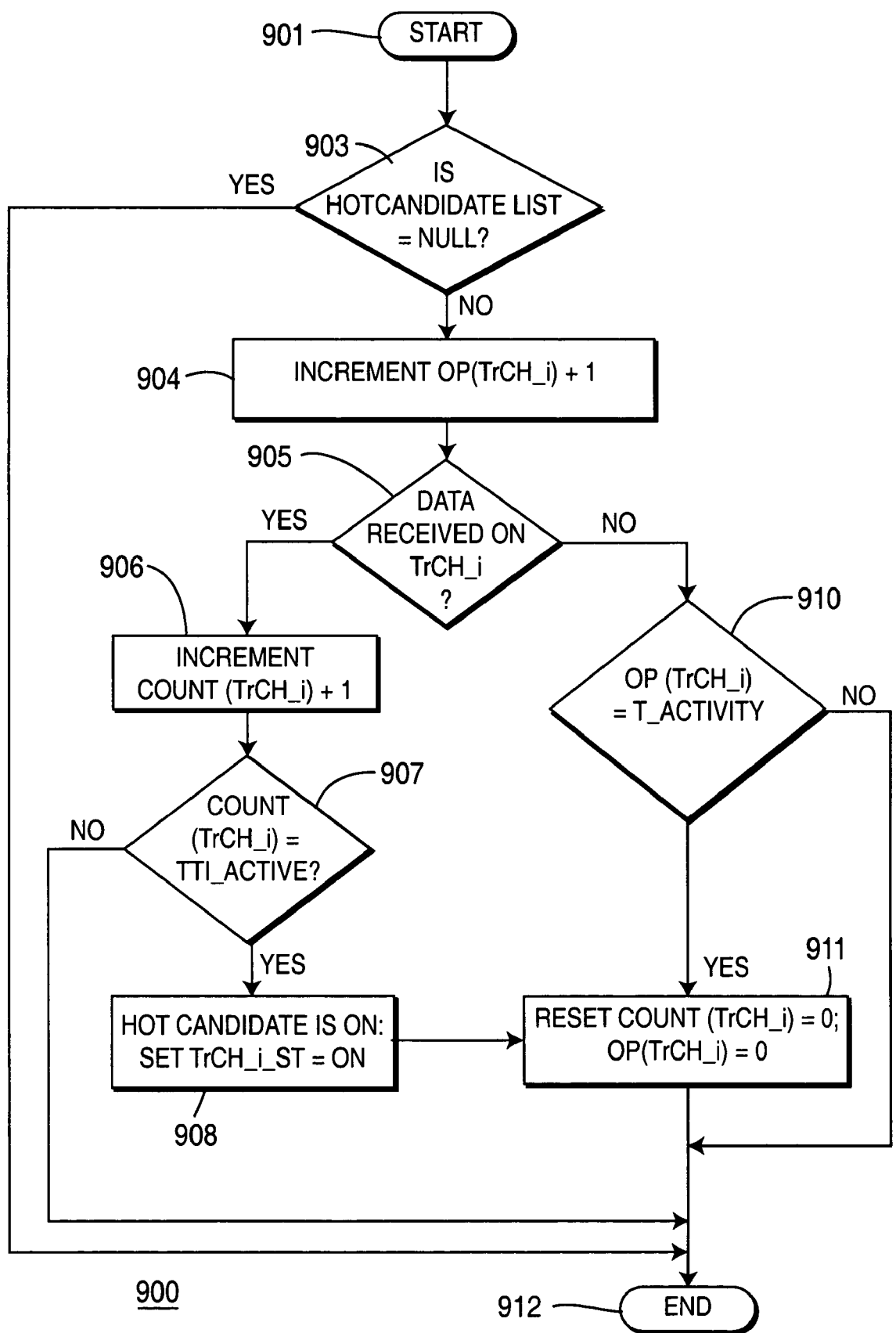
FIG. 9 shows a flow diagram of the monitoring of transport channels in a hot-candidate list that are in "OFF" state.

Step 503 is shown in further detail by the flow diagram of FIG. 9, which illustrates process 900 for RTrCH monitoring using TrCH hot-candidate list HOTCAND_LIST. Process 900 monitors each hot-candidate transport channel TrCH_i in HOTCAND_LIST (currently in OFF state) to determine whether it is possible to declare it to be in the ON state. Process 900 is run for each transport channel TrCH_i in the hot-candidate list at every TTI for the particular hot-candidate TrCH_i. Thus, if there are three hot-candidates TrCH_i, there will be three parallel processes 900 operating to monitor each hot-candidate TrCH_i respectively. Preferably, the monitoring point occurs at the TTI boundary of hot-candidate TrCH_i plus a nominal TTI_Tolerance.

Process 900 starts at step 901 and proceeds to step 903 where it is determined whether there are any hot-candidates TrCH_i in the hot-candidate list HOTCAND_LIST. If the hot-candidate list HOTCAND_LIST is empty, process 900 ends at step 912. If, however, there are hot-candidates TrCH_i present in HOTCAND_LIST, observation period OP(TrCH_i) is incremented (step 904).

The next decision (step 905) is whether data has been received on the monitored hot-candidate TrCH_i. If data has been received, counter COUNT(TrCH_i) is incremented to reflect the data reception at step 906. Next, COUNT(TrCH_i) is checked to determine whether the count has reached the predetermined reference value TTI_Active (i.e., to determine whether enough activity on the RTrCH has occurred such that the status TrCH_i_ST can be switched from OFF to ON). If counter COUNT(TrCH_i) does not equal the required minimum TTI_Active reference value, process 900 ends at step 912. However, if in step 907 counter COUNT(TrCH_i) has reached the requisite number for activity, the hot-candidate state TrCH_i_ST is turned ON (step 908), and the hot-candidate counters COUNT(TrCH_i) and OP(TrCH_i) are reset to zero (step 911), before ending the process at step 912.

Returning to decision step 905, if data is not received on the hot-candidate TrCH_i, a decision at step 910 commences where the observation period for the hot-candidate OP(TrCH_i) is checked against parameter T_Activity, yielding whether the predetermined acceptable number of observation periods has elapsed. If so, the counter COUNT(TrCH_i) for hot-candidate TrCH_i and the observation period counter OP(TrCH_i) are both reset to zero (step 911), and process 900 ends at step 912. If the observation period OP(TrCH_i) is not equal to the value for T_Activity, the counters maintain their counts for subsequent cycles of process 900, and process 900 ends at step 912.

Figure 10:
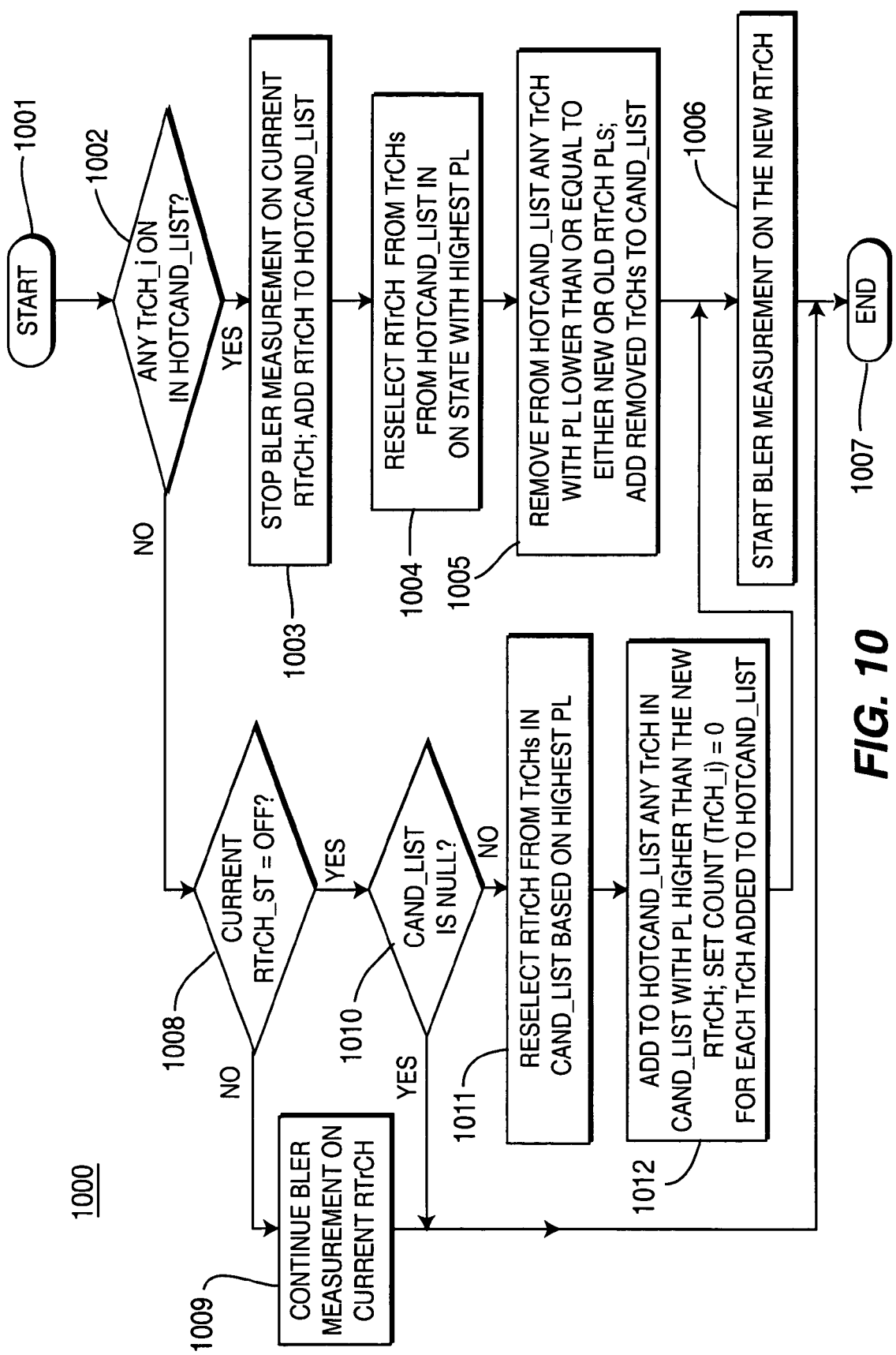
FIG. 10 shows a flow diagram of the switching of RTrCHs during reselection using a hot-candidate list.

FIG. 10 shows a flow diagram of process 1000, which shows steps 504 and 506 in further detail. Process 1000 involves the decision making process for whether to reselect the RTrCH from the hot-candidate list HOTCAND_LIST, based on the appropriateness of the current frame timing, and if a suitable replacement transport channel has become sufficiently active. Process 1000 occurs at every largest TTI boundary, which is at every 40 ms for the set of five (5) transport channels TrCH1-5 shown in FIG. 3C. As aforementioned, this boundary is chosen to avoid switching TrCHs that may be in midstream. Process 1000 begins at step 1001 and proceeds to a decision step 1002 as to whether there is at least one hot-candidate TrCH_i in the ON state in list HOTCAND_LIST. If so, BLER measurement on the current RTrCH is ceased as it now becomes the former RTrCH, and now the former RTrCH is added to HOTCAND_LIST. Next in step 1004, the TrCH with the highest preference level PL from HOTCAND_LIST is reselected as the new RTrCH. Next in step 1005, any TrCH_i in the HOTCAND_LIST with PL less than equal to either the new or the prior RTrCH preference level is removed. The removed TrCHs are added to CAND_LIST. Thus, HOTCAND_LIST is maintained with candidates having greater preference level PL than the current RTrCH. Reselection of RTrCH from hot-candidates TrCH_i will occur as soon as a hot-candidate TrCH_i goes ON, regardless if the RTrCH is ON or OFF. Meanwhile, monitoring is limited to hot-candidates TrCH_i, and resources are conserved by eliminating TrCHs from monitoring that are moved to the candidate list CAND_LIST. These CAND_LIST candidates will be eligible for monitoring and reselection if transferred back to HOTCAND_LIST, as described below. BLER measurement resumes in step 1006 using the new RTrCH, and process 1000 is complete at step 1007.

Returning to the decision step 1002, if there are no hot-candidates TrCH_i in the ON state in HOTCAND_LIST, step 1008 checks the ON/OFF state RTrCH_ST for the current RTrCH. If the state of the current RTrCH is ON, BLER measurement is continued using the current RTrCH (step 1009), and process 1000 ends at step 1007. If the state of the current RTrCH is OFF at step 1008, step 1010 commences to check whether CAND_LIST is empty, and if so, process 1000 ends at step 1007. If CAND_LIST is not null, the new RTrCH is reselected from CAND_LIST taking the TrCH with the highest preference level PL, and the current RTrCH becomes the former RTrCH and is added to HOTCAND_LIST (step 1011). Any TrCH in CAND_LIST with PL equal to the new RTrCH PL is added to HOTCAND_LIST (step 1012). Hot-candidate counter COUNT(TrCH_i) is reset to zero for each TrCH added to HOTCAND_LIST. Thus, the list of hot-candidates HOTCAND_LIST is updated to include the best candidates for subsequent reselection. Next, BLER measurement is resumed at step 1006 using the new RTrCH, and process 1000 ends at step 1007.

In an alternative of the first embodiment of the invention, reselection of the RTrCH is the same as the first embodiment process 100 using candidates from CAND_LIST, but the monitoring of the RTrCH is not in a periodic fashion on a TTI basis as in step 103 of FIG. 2. Instead, monitoring of the RTrCH occurs aperiodically at detection of data on any of the transport channels. Once data is detected, it can be established that at that moment, the current frame is at a TTI boundary. The current frame is tracked by using the encoded CFN contained in the received frame header.

Figure 11:
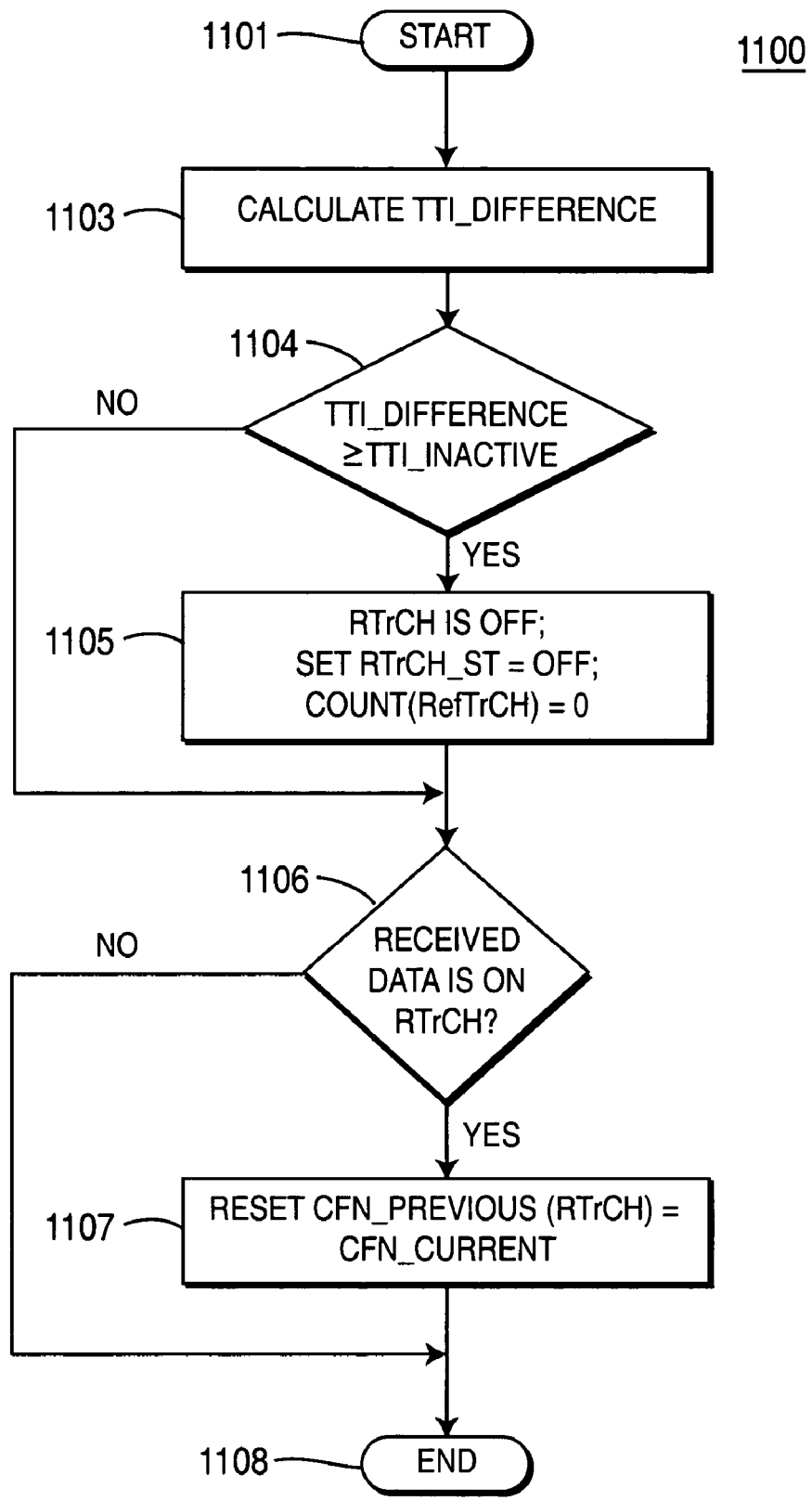
FIG. 11 shows a flow diagram of the monitoring of the current RTrCH in "ON" state at every data reception.

FIG. 11 shows a flow diagram of a process 1100, which performs RTrCH monitoring on a data reception basis. Process 1100 is a modification of process 200 shown in FIG. 4, where monitoring of an active RTrCH is performed to determine when the RTrCH activity subsides enough that it can be declared to be in an OFF state. Process 1100 starts at step 1101, and is repeated at every data reception on any transport channel to accommodate current frame tracking performed in step 1103. At step 1103, the number of elapsed TTIs between data detections, represented by TTI_Difference, is calculated, using the following relationship:

$$\text{TTI\_Difference} = \text{FLOOR}\left[\frac{(\text{CFN\_Current} + 256 - \text{CFN\_Previous}(RTrCH))\bmod 256}{TTI(RTrCH)}\right] \quad \text{Equation 1}$$

CFN_Current represents the current connection frame number CFN as identified in the received data frame received on any of the transport channels multiplexed on the CCTrCH. Value CFN_Previous(RTrCH) represents the CFN of the frame in which the last data detection occurred on the RTrCH. The FLOOR function yields the integer value rounded down from the ratio in Equation 1. The preferred frame structure is defined by a repeating set of 256 frames, as evident by the mod256 operation in Equation 1, but other frame parameter types may be readily used within the scope of the present invention, whereby Equation 1 can be modified accordingly.

Following calculation step 1103 is the decision whether the number of inactive TTIs from value TTI_Difference has reached or exceeded the predetermined threshold TTI_Inactive (step 1104). For example, if it is desired to have no more than five (5) sequential inactive TTIs for a RTrCH, parameter TTI_Inactive is predefined to equal five (5). If value TTI_Difference meets or exceeds five (5), the RTrCH is declared OFF (RTrCH_ST=OFF), as shown in step 1105.

At decision step 1106, it is determined whether the transport channel on which data was received is the RTrCH. If so, the counter CFN_Previous (RTrCH) is reset to zero at step 1107 and process 1100 ends at step 1108. This reset occurs since process 1100 only tracks inactive readings of the RTrCH, as the objective is to determine when the RTrCH can be declared OFF. If, however, no data was received on the RTrCH at step 1106, the RTrCH counter CFN_Previous (RTrCH) is not incremented in step 1107, and process 1100 ends at step 1108. With no data received on the RTrCH at the current frame, at least another frame has transpired without data reception, which will be accounted for at the next calculation of TTI_Difference when process 1100 is repeated at any data reception.

Figure 12:
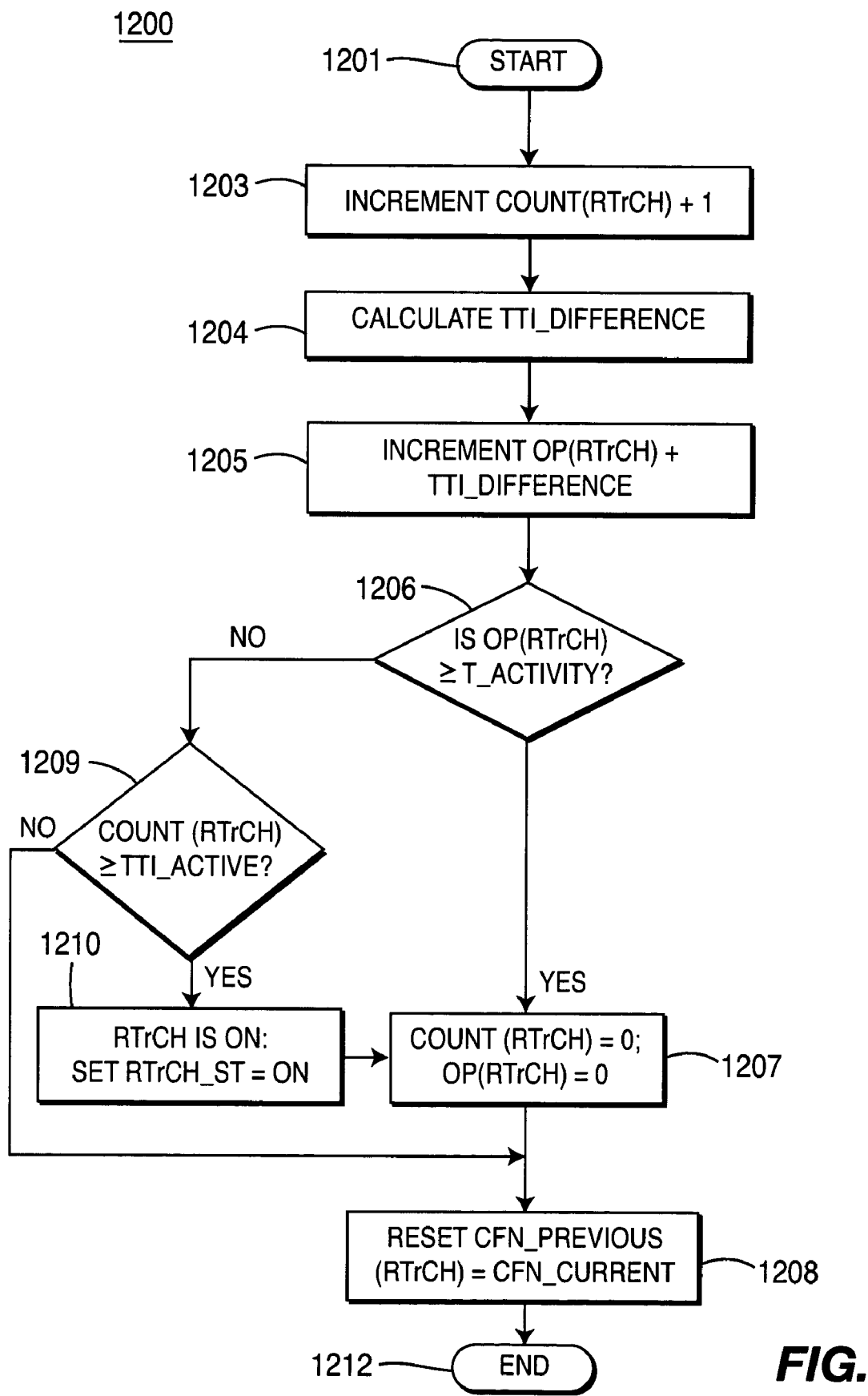
FIG. 12 shows a flow diagram of the monitoring of the current RTrCH in "OFF" state at every data reception.

Turning to FIG. 12, a flow diagram for a process 1200 that operates under an alternative to the first embodiment of the invention, where monitoring of the RTrCH is performed while it is OFF, to decide when it can be considered reactivated, and thus declared ON (i.e., RTrCH_ST=ON). Process 1200 is an alteration of channel monitoring process 300 of FIG. 6, where the alteration is that monitoring is triggered by RTrCH data reception. Process 1200 begins at step 1201 and the process is repeated at every data reception on the RTrCH. At step 1203, RTrCH counter COUNT(RTrCH) is incremented by one (step 1203) because data was detected on the RTrCH at commencement of process 1200. Next, TTI_Difference is calculated in step 1204 using Equation 1 for establishing the number of TTIs elapsed between data detections on the RTrCH. Observation period OP(RTrCH) is then incremented by value TTI_Difference (step 1205) which captures possibly several TTIs. In contrast to process 300, in which OP(RTrCH) is incremented every TTI regardless of data detection, process 1200 has the advantage of reduced processing as monitoring is suspended during the TTIs with no data reception.

Decision step 1206 examines whether the observation period OP(RTrCH) has reached parameter T_Activity indicating that the predetermined acceptable number of observation periods has elapsed. If so, RTrCH counters COUNT (RTrCH) and OP(RTrCH) are reset to zero and counter CFN_Previous(RTrCH) is reset to CFN_Current. These reset counters reflect that too much time has elapsed since the last data detection, preventing a valid channel state change from OFF to ON, and a new observation period commences.

Returning to step 1206, a negative result means that there is still an opportunity for the channel state to change, and process 1200 proceeds to step 1209. The RTrCH counter COUNT(RTrCH) is compared to the predetermined reference TTI_Active, to determine whether enough activity on the RTrCH has occurred such that the status can be switched from OFF to ON. If counter COUNT(RTrCH) is less than the required minimum TTI_Active reference, counter CFN_Previous(RTrCH) is reset to CFN_Current (step 1208) and process 1200 ends at step 1212. However, if in step 1209 the counter COUNT(RTrCH) has reached the requisite number for activity TTI_Active, the RTrCH state is set to ON (step 1210), and counters COUNT(RTrCH) and OP(RTrCH) are reset to zero (step 1207) before resetting CFN_Previous (RTrCH) at step 1208.

Figure 13:
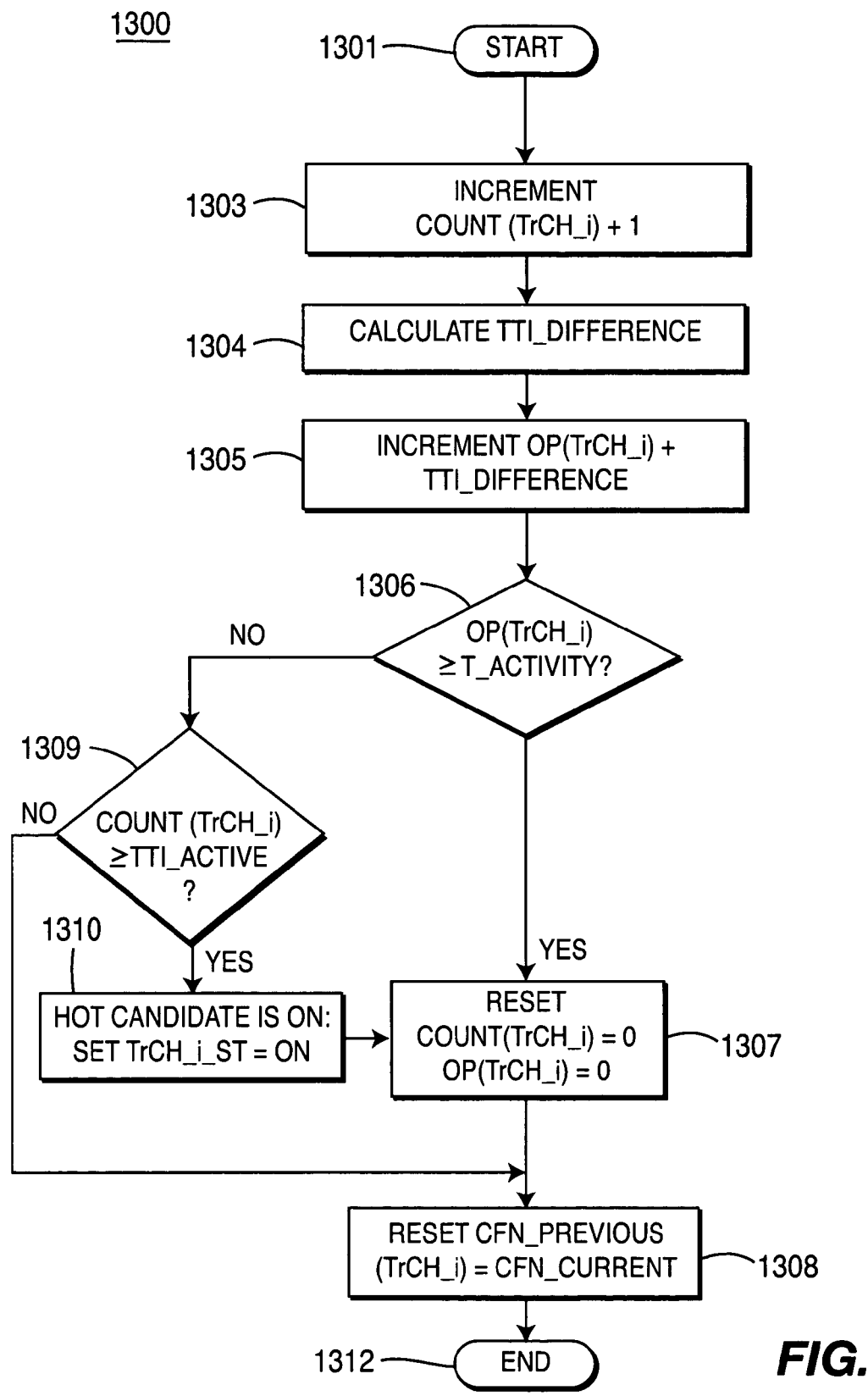
FIG. 13 shows a flow diagram of the monitoring at every data reception of transport channels in a hot-candidate list in "OFF" state.

An alternative to the second embodiment of the present invention involves monitoring of hot-candidates, but the monitoring occurs at every data reception on any hot-candidate TrCH_i rather than at every TTI. FIG. 13 shows a flow diagram of process 1300, which is similar to process 900 of FIG. 9. Once process 1300 commences at step 1300, hot-candidate counter COUNT(TrCH_i) is incremented at step 1303 to reflect the reception of data. Next, value TTI_Difference is calculated according to Equation 2 (step 1304):

$$TTI\_Difference = FLOOR\left[\frac{(CFN\_Current + 256 - CFN\_Previous(TrCH\_i)) \bmod 256}{TTI(TrCH\_i)}\right] \quad \text{Equation 2}$$

CFN_Current represents the current connection frame number CFN as identified in the received data frame received on any of the transport channels multiplexed on the CCTrCH. Value CFN_Previous(TrCH_i) represents the CFN of the frame in which the last data detection occurred on the monitored hot-candidate TrCH_i. Hot-candidate observation period OP(TrCH_i) is incremented by the value TTI_Difference (step 1305). The first decision step 1306 checks whether observation period OP(TrCH_i) has reached the predetermined parameter T_Activity, yielding whether the predetermined acceptable number of observation periods has elapsed. If true, the counter COUNT(TrCH_i) for hot-candidate TrCH_i and the observation period counter OP(TrCH_i) are both reset to zero, (step 1307) and frame counter CFN_Previous(TrCH_i) is reset to value CFN_Current (step 1308), bringing process 1300 to an end at step 1312. If at step 1306 the observation period OP(TrCH_i) is not equal to the value for T_Activity, hot-candidate counter COUNT(TrCH_i) is checked for whether the count has reached the predetermined reference value TTI_Active. This decision at step 1309 determines whether enough activity on the hot-candidate transport channel has occurred such that the status can be switched from OFF to ON. If counter COUNT(TrCH_i) does not equal the required minimum TTI_Active reference value, the frame counter is reset at step 1308 and process 1300 ends at step 1312. However, if in step 1309 the count has reached the requisite number for activity, the hot-candidate state TrCH_i_ST is turned ON (step 1310), and hot-candidate counters COUNT(TrCH_i) and OP(TrCH_i) are reset to zero (step 1307), before resetting CFN_Previous(TrCH_i) at step 1308.

Figure 1A:
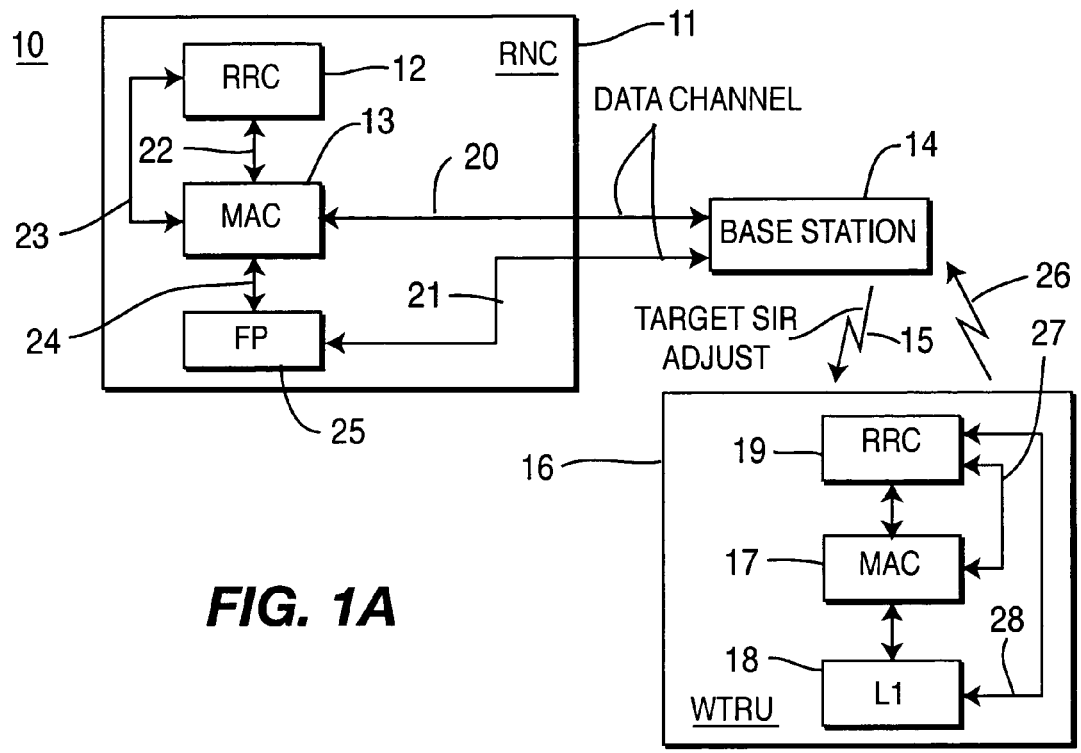
FIG. 1A shows a block diagram of communication system.
Figure 1B:
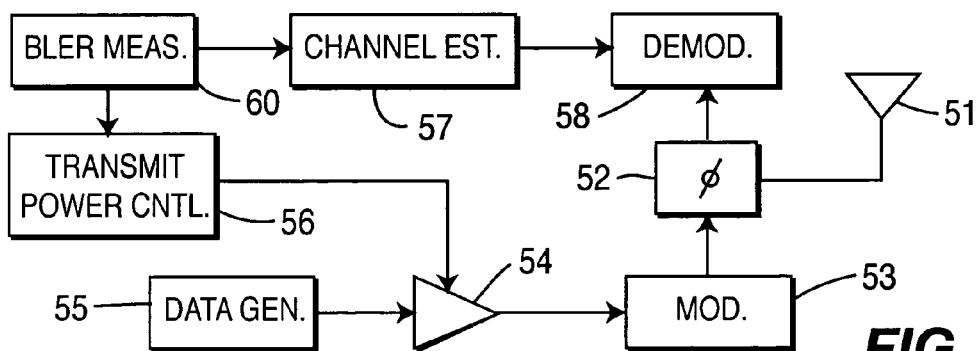
FIG. 1B shows a block diagram of a WTRU related to the present invention.
Figure 1C:
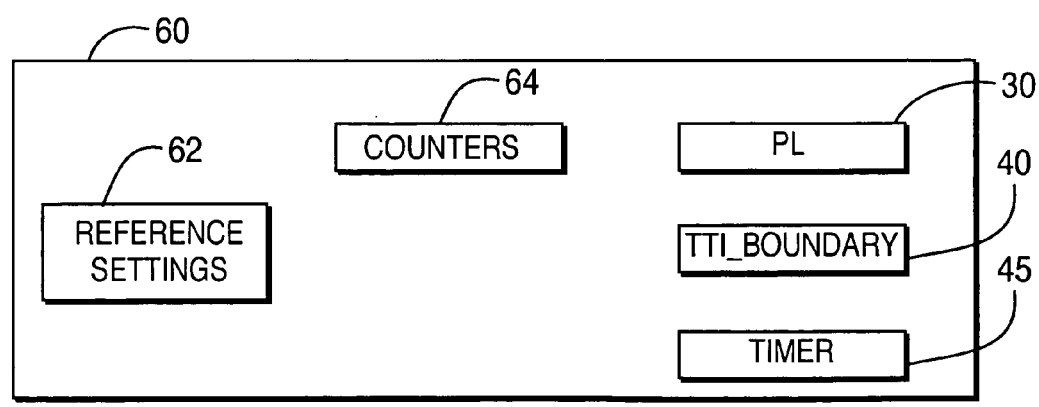
FIG. 1C shows a BLER measurement unit related to the present invention.

Implementation of the preferred methods will now follow in reference to FIGS. 1A-1C. FIG. 1A shows a block diagram for a 3GPP UTRAN system 10, comprising a radio network controller (RNC) 11 communicating with WTRU 16 through base station 14. Since the general functionality of an RNC, base station, and WTRU are known by those skilled in the art, these components will only be described hereinafter to the extent that such functionality is relevant to the present invention. RNC 11 comprises many components that interact on several communication layers, but those of interest for the purpose of the present invention are shown in FIG. 1A. They are a radio resource control (RRC) layer 12, medium access control (MAC) layer 13, and frame protocol (FP) entity 25. RRC 12 is responsible for performing outer loop power control of communication system 10, which produces target SIR adjustments. MAC 13 performs the BLER measurement, which is a necessary input for outer loop power control. Alternatively, frame protocol (FP) entity 25 performs the BLER measurement.

RRC 12 is linked to MAC 13 via communication path 22, which is linked in turn to FP 25 via communication path 24. MAC control path 23 is used to transmit the BLER measurement from MAC 13 to RRC 12, from which the target SIR adjustment is generated. Data channel paths 20 and 21 transmit the received communication data from WTRU 16 to MAC 13 and FP entity 25, respectively, via base station 14.

WTRU 16 comprises RRC layer 19, MAC layer 17, and L1 layer 18. RRC 19 and MAC 17 perform functions similar to RRC 12 and MAC 13 associated with RNC 11. L1 layer 18 is a physical (PHY) layer to which transport channels are mapped on the CCTrCH for UL transmission 26. MAC control path 27 is used to transmit the BLER measurement from MAC 17 to RRC 19 when BLER measurement is performed by MAC 17. Alternatively, Li layer 18 performs BLER measurement of WTRU 16 and the BLER measurement is transmitted across L1 layer control path 28 to RRC 19.

Base station 14 communicates through data channels 20, 21 with RNC MAC layer 13 and FP entity 25. The SIR target adjustment is achieved through signaling over the air interface on the DL signal 15 between WTRU 16 and base station 14. In an alternative embodiment, base station 14 includes a MAC layer, which may perform the BLER measurement in lieu of MAC layer 13 of RNC 11.

FIG. 1B shows a block diagram of WTRU 16, comprising antenna 51, isolator 52, modulator 53, amplifier 54, data generator 55, transmit power control unit 56, BLER measurement unit 60, channel estimation unit 57, and demodulator 58. BLER measurement unit 60 includes composite channel signal processing circuitry that comprises error measurement circuitry, monitoring circuitry and reference channel selection circuitry. A description of the BLER measurement unit 60 in the context of the remainder of WTRU 16 components now follows.

On the receiver side of WTRU 16, antenna 51 receives various RF signals. Alternatively, antenna 51 may comprise an antenna array. The received signals are passed through isolator 52 to demodulator 58 to produce a baseband signal. The baseband signal is processed by channel estimation device 57, which commonly uses a training sequence component in the baseband signal to provide channel information, such as channel impulse responses. Channel estimation device 57 is capable of separating the RTrCH from all other channels in the baseband. BLER measurement unit 60 determines the BLER with respect to the current RTrCH. The BLER measurement is received by the transmit power control unit 56, which converts the BLER information into a control signal for power adjustment in amplifier 54. Amplifier 54 receives the data signal for transmission from data generator 55. On the transmission side, the data signal is amplified according to the adjusted power control signal from transmit power control unit 56. The amplified signal is modulated at modulator 53, passed through isolator 52, and transmitted over antenna 51.

FIG. 1C shows BLER measurement unit 60 in further detail. Preferably, BLER measurement unit 60 performs BLER measurements within the MAC layer 13 for RNC 11 and MAC layer 17 of WTRU 16. BLER measurement unit 60 comprises memory unit 62, register 64, preference level unit 30, TTI_Boundary unit 40, and timer 45. BLER measurement unit 60 is responsible for ascertaining whether a TrCH or the RTrCH is ON or OFF based on a cumulative count of presence or absence of data in the form of transport blocks (TBs) over time period in terms of TTIs, according to the preferred method embodiments.

Preference level unit 30 assigns a preference level PL to each TrCH for selection as the RTrCH. Register 64 maintains the plurality of counters used in the ON/OFF state monitoring of TrCHs and the RTrCH according to the present invention, comprising frame counter COUNT(F), RTrCH observation period OP(RTrCH), candidate list CAND_LIST, hot-candidate list HOTCAND_LIST, the RTrCH ON/OFF state RTrCH_ST, RTrCH counter COUNT(RTrCH), hot-candidate observation period OP(TrCH_i), hot-candidate counter COUNT(TrCH_i), and hot-candidate ON/OF state TrCH_i_ST. Memory unit 62 stores predetermined reference settings utilized by BLER measurement unit 60 for the decision process of whether to declare a TrCH or the RTrCH in the ON or OFF state, as presented above in TABLE 2.

With respect to the RTrCH monitoring point, timer 45 increments frame counter COUNT(F) every 10 ms. TTI_Boundary unit 40 works in conjunction with timer 45 to confirm whether the current frame is at a TTI boundary, and also determines the largest common TTI boundary among the candidate TrCHs to allow optimum synchronization for the switching of the RTrCHs. TTI_Boundary unit 40 performs a ratio calculation to determine TTI_Difference based on the value from counter COUNT(F) and the TTI size of the monitored transport channel. If the ratio yields an integer value, it is established that the current frame is at a TTI boundary. For example, if the TTI size is 20 ms, and the COUNT(F) value is 5, the yielded result is 50/20=2.5, which is not at a TTI boundary. Alternatively, spontaneous detection of data could commence tracking of the RTrCH state, rather than the periodic monitoring points shown in regular intervals in FIG. 5. The system CFN identified in each frame header can be used to track the number of TTIs that elapsed between occurrences of data detection on the RTrCH. This alternative embodiment would require less processing resources and eliminate the need for using timer 45. Reference channel selection circuitry within BLER measurement unit 60 is configured to reselect RTrCH responsive to monitoring of the ON and OFF states of RTrCH and hot-candidates TrCH_i. Once reselection is made, BLER measurement commences on the new reference channel RTrCH.

What is claimed is:

1. A method of reselecting a reference channel, the method comprising:

transmitting a composite channel on which a plurality of channels are multiplexed, wherein an error rate measurement is performed on received signals on a reference channel selected from the plurality of multiplexed channels for use in selectively controlling transmission of the composite channel;

selecting a channel from the plurality of multiplexed channels as the reference channel initially used for error rate measurement;

monitoring the reference channel based on a quantitative data content criteria to determine an ON state when the quantitative data content criteria is met and an OFF state when the quantitative data content criteria is not met; and selecting a different channel from the plurality of multiplexed channels as the reference channel when monitoring of the reference channel reflects an OFF state, wherein:

the channels are transport channels (TrCHs) and the reference channel is a reference transport channel (RTrCH), each TrCH has a transport time interval (TTI) of a given size of which a largest TTI size is an integer multiple, the TrCHs are multiplexed on a coded composite transport channel (CCTrCH), a block error rate measurement is performed on the RTrCH, and monitoring of the RTrCH is performed at a time interval corresponding to the TTI size of the RTrCH;

the TrCHs each have a block error rate (BLER) requirement and a TrCH having a least restrictive BLER requirement is selected as the RTrCH initially used for error rate measurement;

N number of TrCHs multiplexed onto the CCTrCHT;

the TrCHs are assigned a preference level for selection, first through $N^{th}$, the first preference level being highest;

the preference level is based first on the BLER requirement and then on TTI size, such that the first TrCH has a least restrictive BLER requirement and a smallest TTI size among TrCHs having the same BLER requirement;

the $N^{th}$ TrCH has a most restrictive BLER requirement and a largest TTI size among TrCHs having the same BLER requirement; and the first TrCH is selected as the RTrCH initially used for error rate measurement.

2. The method of claim 1 wherein when the first TrCH is selected as the RTrCH and monitoring of the first TrCH channel reflects an OFF state, the second TrCH is then selected as the RTrCH.

3. The method of claim 1 wherein when an $i^{th}$ TrCH is selected as the RTrCH, where i is less than N, and monitoring of the $i^{th}$ TrCH channel reflects an OFF state, a different TrCH is then selected as the RTrCH from among the group of channels consisting of the first TrCH through the $(i+1)^{th}$ TrCH.

4. The method of claim 3 wherein when the $i^{th}$ TrCH is selected as the RTrCH, the first through the $i^{th}$ TrCHs are each monitored based on a quantitative data content criteria to determine an ON state when the quantitative data content criteria is met and an OFF state when the quantitative data content criteria is not met and when monitoring of the $i^{th}$ TrCH channel, such that if any TrCH with a preference level higher than the RTrCH is determined to be in an ON state, a TrCH that is determined to be in an ON state with highest preference level is then selected as the reselected RTrCH.

5. The method of claim 4 wherein monitoring of a TrCH is performed no less than once during each time interval corresponding to the TTI size of the TrCH.

6. The method of claim 4 wherein the determining when a TrCH is in an OFF state includes determining that data was not received on the TrCH for a predetermined number of consecutive TTIs of the TrCH.

7. The method of claim 4 wherein the determining when TrCH is in an ON state includes determining that data was received on the TrCH in at least one of a predetermined number of TTIs of the TrCH.

8. The method of claim 4 wherein a TrCH having the largest TTI size defines TTI boundaries based on that largest size for all TrCHs and the selecting a different TrCH from the plurality of multiplexed TrCH as the RTrCH becomes effective at one of such defined TTI boundaries.

9. A wireless transmit receive unit (WTRU) comprising:
a transmitter configured to transmit a composite channel on which a plurality of channels are multiplexed;
an error rate measurement circuit to perform measurements on received signals on a reference channel selected from the plurality of multiplexed channels for use in selectively controlling transmission of the composite channel; and composite channel received signal processing circuitry comprising:
monitor circuitry configured to monitor the selected reference channel based on a quantitative data content criteria to determine an ON state when the quantitative data content criteria is met and an OFF state when the quantitative data content criteria is not met; and
reference channel circuitry configured to be responsive to the monitoring circuitry such that when monitoring of the reference channel reflects an OFF state, the reference channel selection circuitry selects a different channel from the plurality of multiplexed channels as the reference channel for the error measurement circuitry and the monitoring circuitry, wherein:
the channels are transport channels (TrCHs);
the reference channel is a reference transport channel (RTrCH),
each TrCH has a transport time interval (TTI) of a given size of which a largest TTI size is an integer multiple,
the TrCHs are multiplexed on a coded composite transport channel (CCTrCH),
the error rate measurement circuitry is configured to perform a block error rate measurement on the RTrCH;
the monitoring circuitry is configured to monitor the RTrCH no less than during each time interval corresponding to the TTI size of the RTrCH;
the TrCHs each have a block error rate (BLER) requirement;
the reference channel circuitry is configured with a TrCH having a least restrictive BLER requirement as the default TrCH selection initially used as the RTrCH;
there are N number of TrCHs multiplexed onto the CCTrCH;
the reference channel selection circuitry is configured to assign a preference level for selection to the TrCHs, first through $N^{th}$, the first preference level being highest, based first on their BLER requirement and then on TTI size such that the first TrCH has a least restrictive BLER requirement and a smallest TTI size among TrCHs having the same BLER requirement;
the $N^{th}$ TrCH has a most restrictive BLER requirement and a largest TTI size among TrCHs having the same BLER requirement; and
the first TrCH is selected as the RTrCH initially used for error rate measurement.

10. The WTRU of claim 9 wherein said reference channel selection circuitry is configured such that when the first TrCH is selected as the RTrCH and monitoring of the first TrCH channel reflects an OFF state, the second TrCH is then selected as the reselected RTrCH.

11. The WTRU of claim 9 wherein said reference channel selection circuitry is configured such that when an $i^{th}$ TrCH is selected as the RTrCH, where i is less than N, and monitoring of the $i^{th}$ TrCH channel reflects an OFF state, a different TrCH is then selected as the reselected RTrCH from among the group of channels consisting of the first TrCH through the $(i+1)^{th}$ TrCH.

12. The WTRU of claim 9 wherein a TrCH having the largest TTI size defines TTI boundaries based on that largest size for all TrCHs and said reference channel selection circuitry is configured such that the selecting a different TrCH from the plurality of multiplexed TrCH as the RTrCH becomes effective at one of such defined TTI boundaries.

13. The WTRU of claim 11 wherein said monitoring circuitry is configured such that when an $i^{th}$ TrCH is selected as the RTrCH, where i is less than N, the first through the $i^{th}$ TrCHs are each monitored based on quantitative data content criteria to determine an ON state when the quantitative data content criteria is met and an OFF state when the quantitative data content criteria is not met, and said reference channel selection circuitry is configured such that if any TrCH with a preference level higher than the RTrCH is determined to be in an ON state, a TrCH that is determined to be in an ON state with highest preference level is then selected as the reselected RTrCH.

14. The WTRU of claim 13 wherein said monitoring circuitry is configured such that monitoring of a TrCH is performed no less than once during each time interval corresponding to the TTI size of the TrCH.

15. The WTRU of claim 13 wherein said monitoring circuitry is configured such that the determining when a TrCH is in an OFF state includes determining that data was not received on the TrCH for a predetermined number of consecutive TTIs of the TrCH.

16. The WTRU of claim 13 wherein said monitoring circuitry is configured such that the determining when TrCH is in an ON state includes determining that data was received on the TrCH in at least one of a predetermined number of consecutive TTIs of the TrCH.

* * * * *

UNITED STATES PATENT AND TRADEMARK OFFICE
CERTIFICATE OF CORRECTION

| | |
|---|---|
| PATENT NO. | : 7,453,862 B2 |
| APPLICATION NO. | : 10/675639 |
| DATED | : November 18, 2008 |
| INVENTOR(S) | : Adjakple et al. |

Page 1 of 1

It is certified that error appears in the above-identified patent and that said Letters Patent is hereby corrected as shown below:

At column 14, line 34, before the word "layer" delete "Li" and insert therefore --L1--.

At claim 1, column 16, line 27, after the words "onto the" delete "CCTrCHT;" and insert therefore --CCTrCH;--.

Signed and Sealed this

Seventeenth Day of March, 2009

JOHN DOLL
*Acting Director of the United States Patent and Trademark Office*